United States Patent [19]

Takahashi

[11] Patent Number: 4,867,302

[45] Date of Patent: Sep. 19, 1989

[54] RECORDING MEDIUM KEEPING CASE

[75] Inventor: Kenji Takahashi, Miyagi, Japan

[73] Assignee: Sony Corporation, Tokyo, Japan

[21] Appl. No.: 298,300

[22] Filed: Jan. 17, 1989

Related U.S. Application Data

[63] Continuation of Ser. No. 219,807, Jul. 14, 1988, abandoned, which is a continuation of Ser. No. 926,204, Nov. 3, 1986, abandoned.

[30] Foreign Application Priority Data

Nov. 1, 1985 [JP] Japan .................................. 60-168701
Nov. 6, 1985 [JP] Japan .................................. 60-170585

[51] Int. Cl.$^4$ ............................................ B65D 85/57
[52] U.S. Cl. ........................... 206/45.13; 206/45.15;
206/45.18; 206/309; 206/312; 220/94 R;
220/318; 220/322; 220/334
[58] Field of Search ................ 206/44 R, 45.13, 45.15,
206/45.18, 307, 309–313, 379, 387, 804;
220/212, 329, 331, 333, 334, 337, 94 R, 318,
322, 324; 221/229, 247–249, 256, 257, 261

[56] References Cited

U.S. PATENT DOCUMENTS

| 2,234,649 | 3/1941 | Meincke | 206/251 |
| 2,403,825 | 7/1946 | Nissenbaum | 206/379 |
| 2,527,158 | 10/1950 | Spitalny | 220/334 |
| 2,589,234 | 3/1952 | Drohman | 206/379 |
| 3,018,876 | 1/1962 | Huot | 206/379 |
| 3,091,327 | 5/1963 | Lalley | 206/804 |
| 3,140,777 | 7/1964 | Gordan | 206/804 |
| 4,330,050 | 5/1982 | Sangster et al. | 220/318 |
| 4,387,807 | 6/1983 | de la Rosa | 206/309 |
| 4,428,013 | 1/1984 | Posso . | |
| 4,449,628 | 5/1984 | Egly et al. | 206/444 |
| 4,496,048 | 1/1985 | Sykes | 206/387 |
| 4,496,050 | 1/1985 | Kirchner et al. . | |
| 4,535,888 | 8/1985 | Nusselder . | |
| 4,615,445 | 10/1986 | Stocchiero | 206/444 |

FOREIGN PATENT DOCUMENTS

| 0168691 | 12/1950 | Austria | 206/45.13 |
| 0044242 | 1/1982 | European Pat. Off. . | |
| 0114631 | 8/1984 | European Pat. Off. . | |
| 0130266 | 1/1985 | European Pat. Off. . | |
| 0187279 | 7/1986 | European Pat. Off. . | |
| 1295257 | 9/1969 | Fed. Rep. of Germany | 206/804 |
| 3414903 | 10/1985 | Fed. Rep. of Germany . | |
| 0141379 | 5/1921 | United Kingdom | 206/312 |
| 2154550 | 9/1985 | United Kingdom . | |

Primary Examiner—Jimmy G. Foster
Attorney, Agent, or Firm—Hill, Van Santen, Steadman & Simpson

[57] ABSTRACT

A recording medium keeping case according to the present invention comprises first and second case members and a recording medium holding member, which are supported pivotably around a pivot. When the first case member is pivotally moved through a predetermined angle relative to the second case member, a first engaging portion provided on the first case member comes into engagement with a first portion to be engaged provided on the recording medium holding member so that as the first case member rotates, the recording medium holding member also rotates.

8 Claims, 8 Drawing Sheets

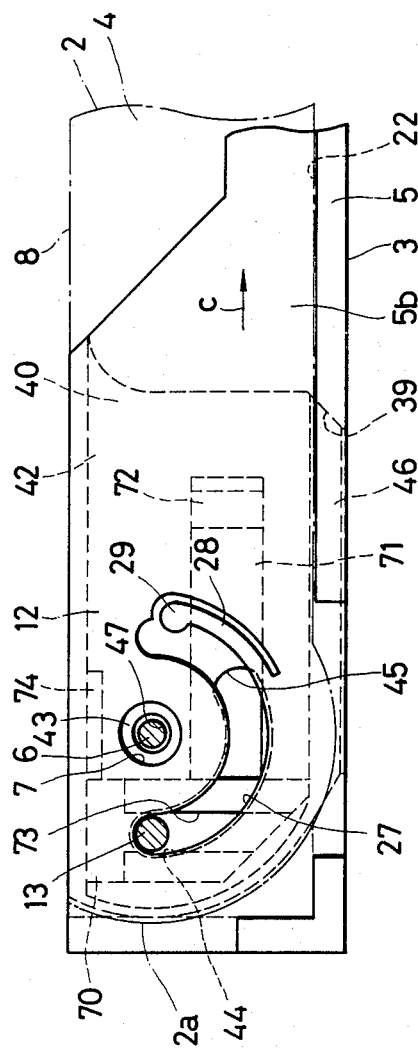
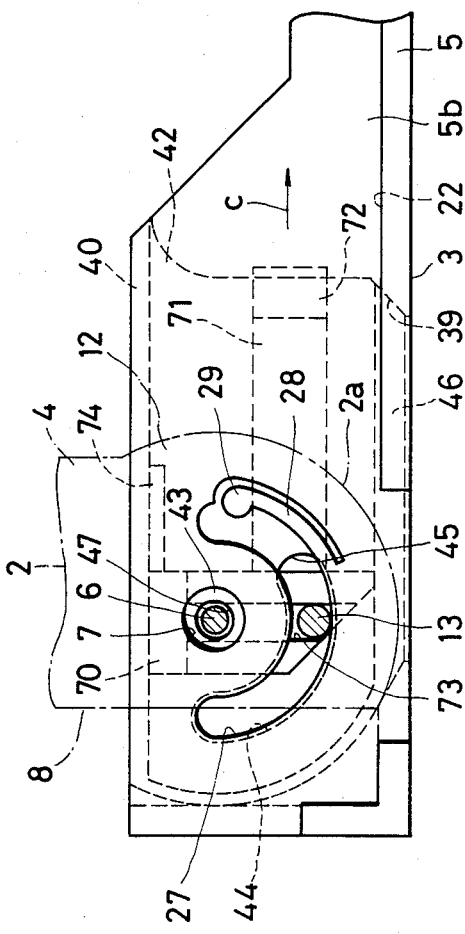
FIG. 4A
FIG. 4B

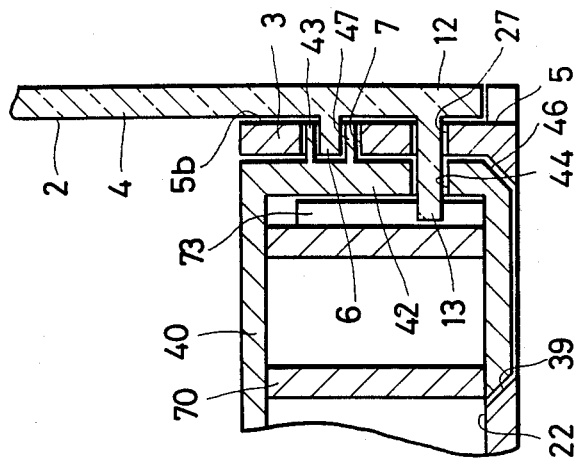
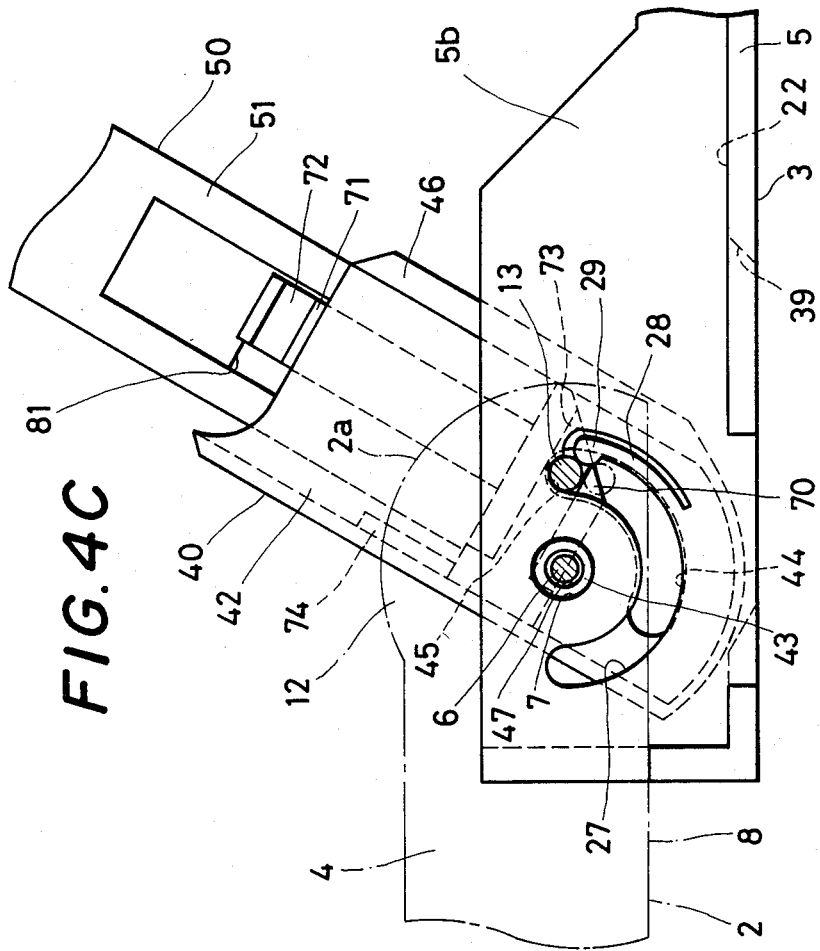

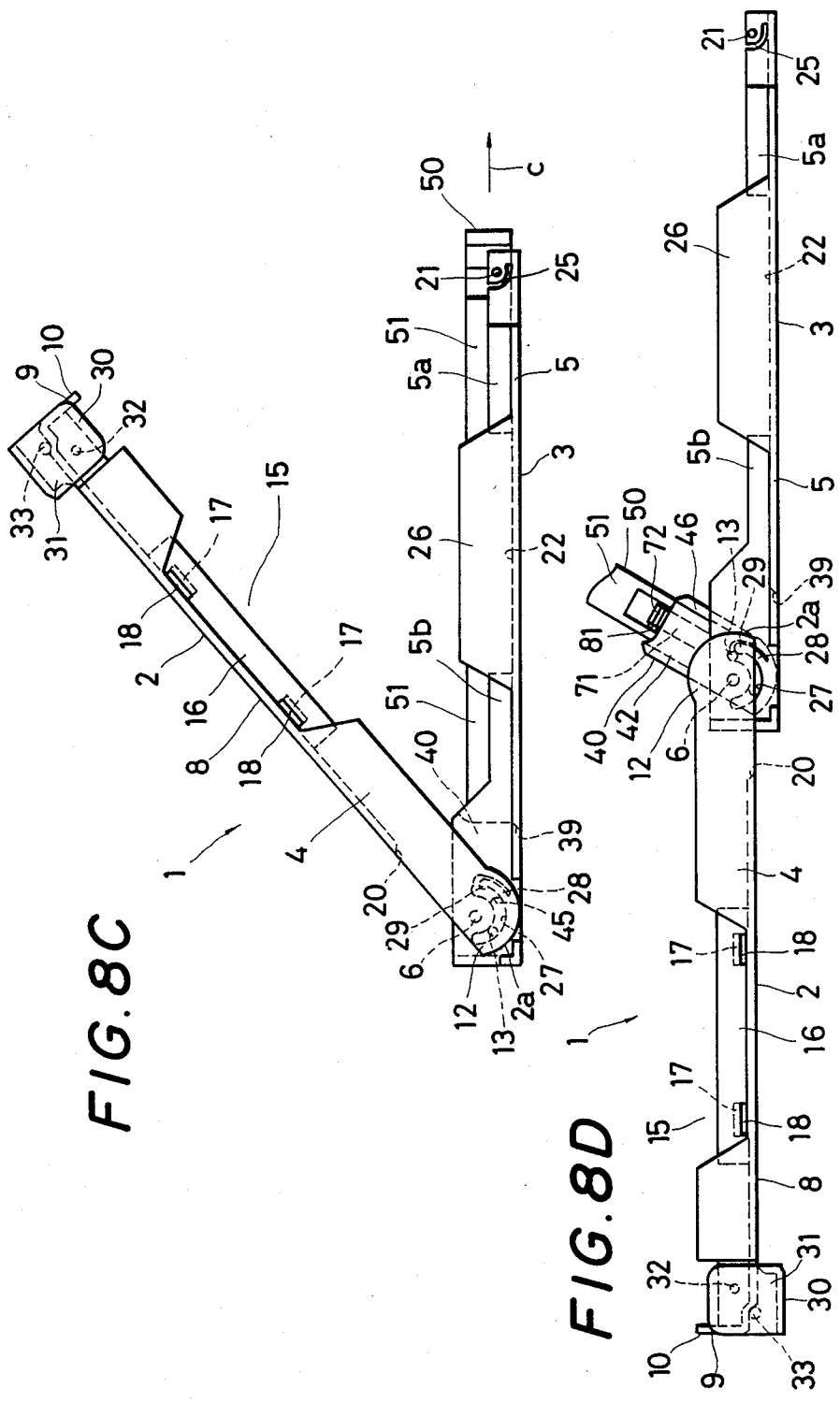

RECORDING MEDIUM KEEPING CASE

This application is a continuation of application Ser. No. 219,807 filed Nov. 3, 1986, now abandoned, which is a continuation of application Ser. No. 926,204, filed Nov. 3, 1986, now abandoned.

BACKGROUND OF THE INVENTION

1. Field of the Invention

The present invention relates to a case for keeping recording media themselves such as optical disks, optical magnetic disks, etc., and recording media such as disk cartridges, tape cassettes, etc.

2. Description of the Prior Art

A conventional case for keeping magnetic recording tape cassettes and the like is composed of a pair of case members pivotably connected each other, in which a pocket portion having a magnetic tape cassette fitted and held thereon is formed on one of these case members. To take out a magnetic tape cassette from a case, both the case members are turned by both hands so that they may be moved apart, the case is supported by one hand, and the magnetic tape cassette is taken out from the pocket portion by the other hand.

However, in the conventional case as described above, when a large and heavy recording medium such as an optical disk and a disk cartridge having a diameter of 30 cm is kept therein, it is difficult to take out the recording medium only by one hand while holding the case by the other.

Thus, the recording medium must be pulled out of the pocket portion in the state where the case is opened on the desk or the like. In this case, there is no clearance between the lower surface of the recording medium and the case member. Accordingly, the conventional case has the disadvantages that the recording medium cannot be taken out while holding both upper and lower surfaces thereof, and in addition, in the case of the large recording medium, both the sides thereof cannot be held by one hand, as a result of which both hands have to be used, thus making it difficult to take out the recording medium.

OBJECTS AND SUMMARY OF THE INVENTION

It is therefore an object of the present invention to provide a recording medium keeping case from which a recording medium can be easily taken out.

It is a further object of the present invention to provide a recording medium keeping case from which the recording medium can be taken out by holding both surfaces of the recording medium by one hand and particularly, a large and heavy recording medium can be easily taken out by one hand.

It is another object of the present invention to provide a recording medium keeping case to which even if vibrations, shocks or the like are applied when it is opened, the recording medium is prevented from being slipped out of a recording medium holding member.

It is still another object of the present invention to provide a recording medium keeping case in which the recording medium holding member and the case member need not be supported by hand in order to prevent said holding member and case member from being rotated to its original position, and yet the recording medium may be easily taken out from the case.

It is another object of the present invention to provide a recording medium keeping case in which locking, unlocking or opening and closing of the case may be carried out by an extremely simple operation.

The above and other objects, features and advantages of the invention will be apparent from the following detailed description which is to be read in conjunction with the accompanying drawings.

BRIEF DESCRIPTION OF THE DRAWINGS

FIGS. 4A to 4C are respectively side views showing the principle of the operation of the case shown in FIG. 1.

FIG. 5 is a sectional view corresponding to FIG. 4B, showing the connecting relationship between the case member, the cartridge holding member and the slider.

FIGS. 8A to 8D are respectively side views showing the opening and closing operation of the case shown in FIG. 1.

DETAILED DESCRIPTION OF THE PREFERRED EMBODIMENT

Figure 1:
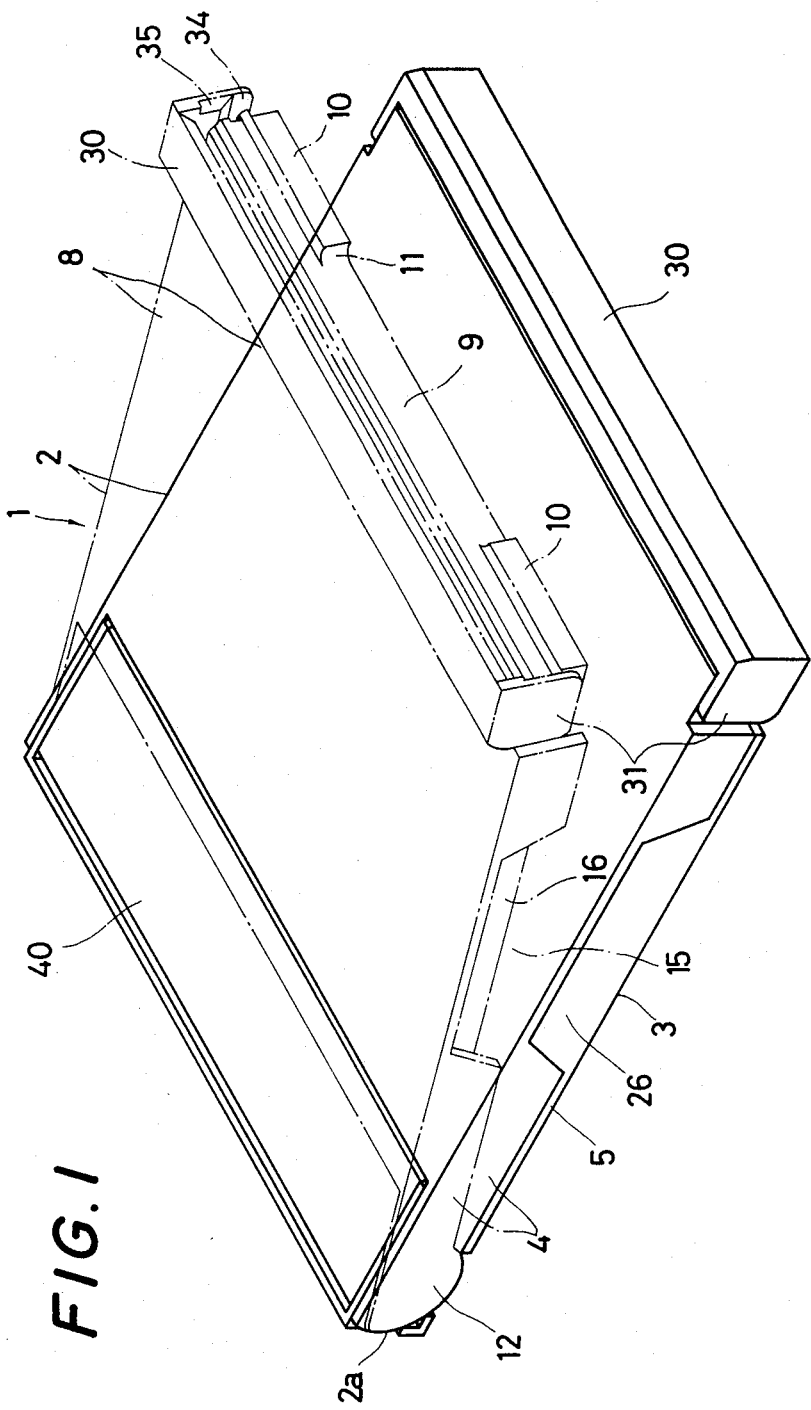
FIG. 1 is a perspective view showing the closed state of a disk cartridge keeping case, which is one embodiment of the present invention.
Figure 2:
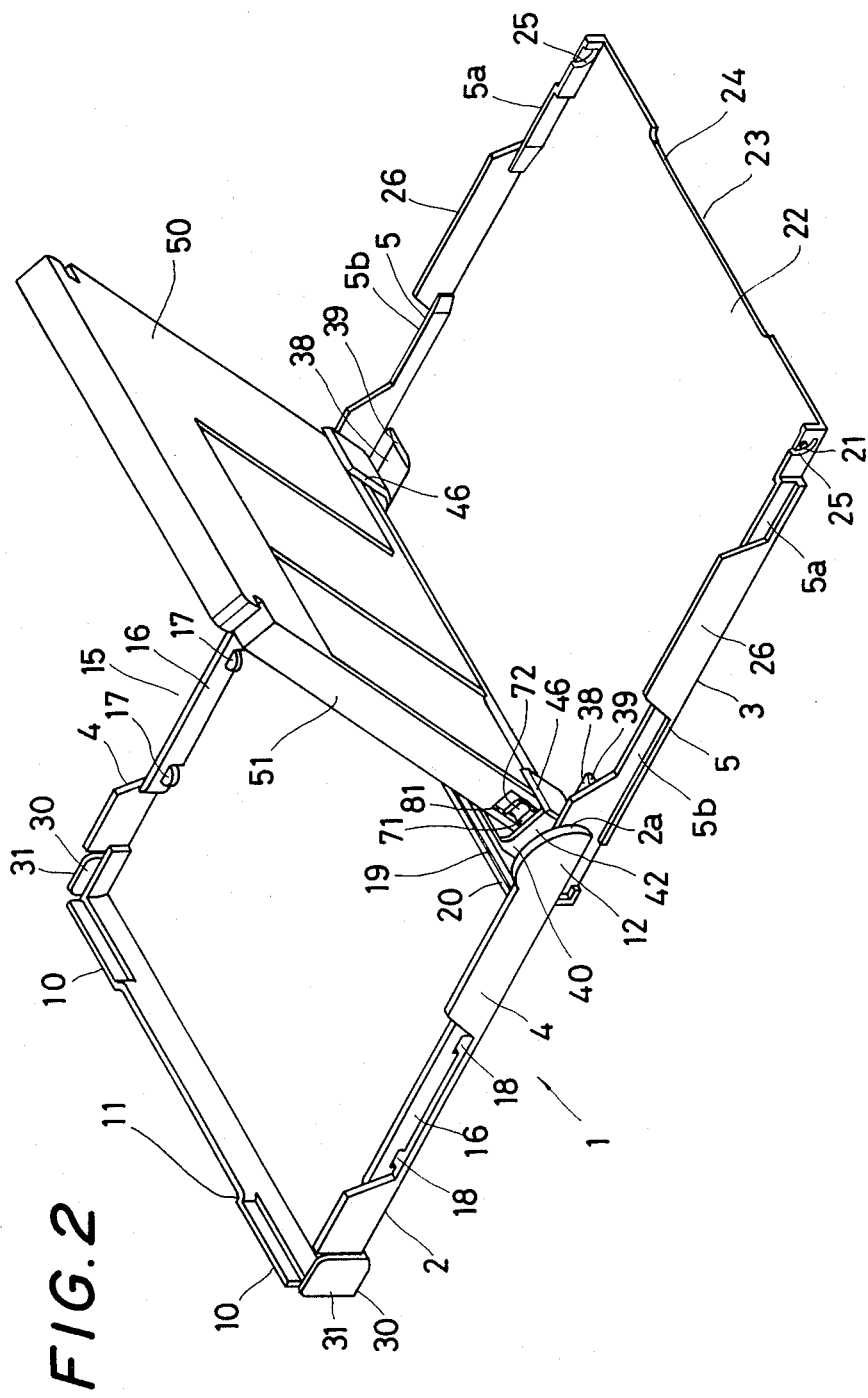
FIG. 2 is a perspective view showing the open state of the case shown in FIG. 1.
Figure 3:
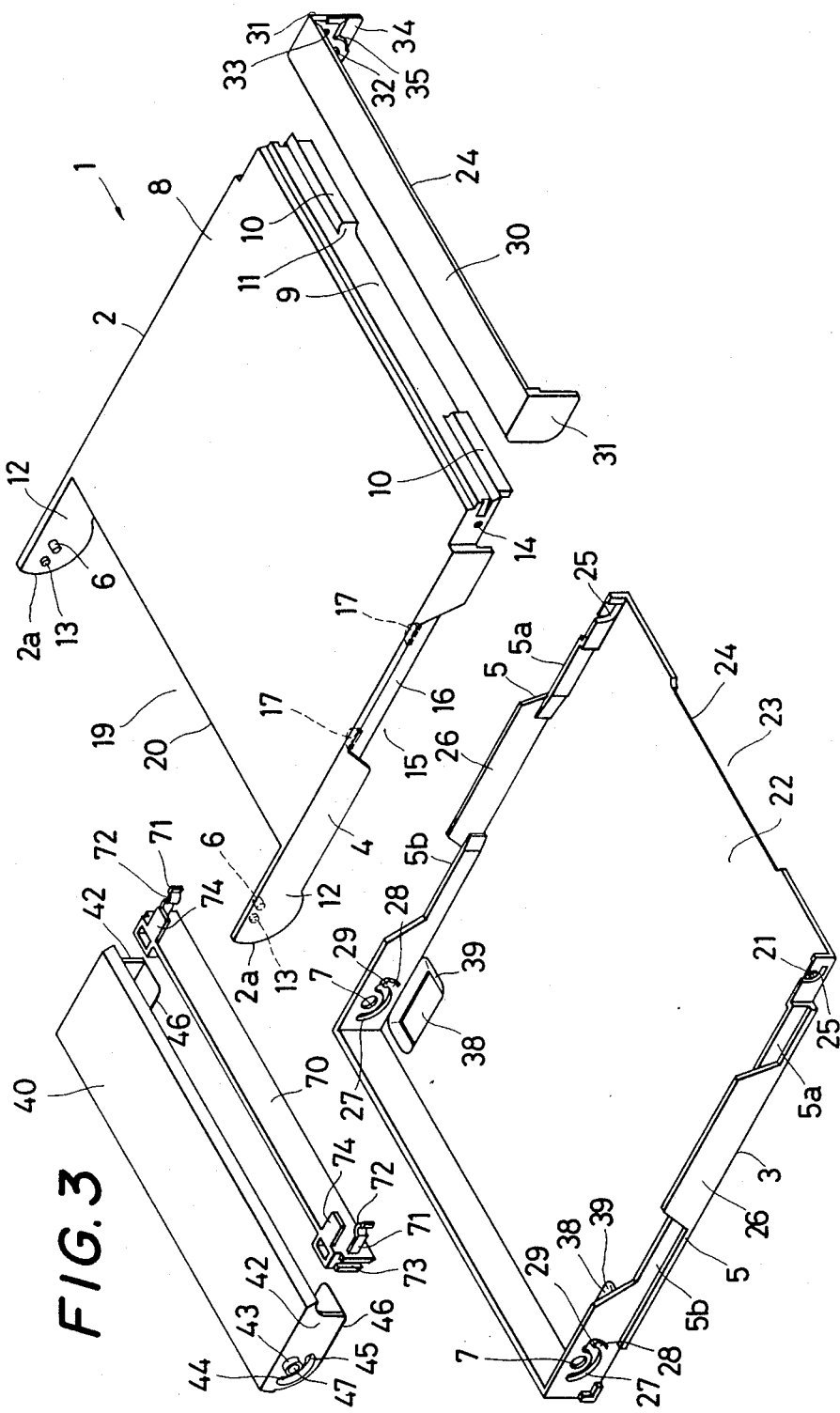
FIG. 3 is an exploded perspective view of the case shown in FIG. 1.

As shown in FIGS. 1 to 3, a disk cartridge keeping case 1 which is one embodiment of the present invention has case members 2 and 3 formed of synthetic resin or the like.

An upper surface 8 of the case member 2 has generally a rectangular shape. A front surface 9 of the case member 2 is provided at opposite ends with raised portions 10 to form a recess 11. This recess 11 is formed to provide a clearance between an opening and closing handle 30 and the front surface 9 of the case member 2 so that when the case 1 is opened, a finger is engaged at the clearance to facilitate rotation of the handle 30.

A rear end 12 of a side portion 4 of the case member 2 is in the form of a semi-circular arc, and a pair of pins 6 is provided internally in the neighbourhood of one end 2a thereof. The pin 6 is inserted through a hole 7 of the case member 3 into a hollow portion 47 of a pin 43 on the side 42 of a cartridge holding member 40, whereby the case member 2 and the case member 3 are connected so that they may be pivotally moved each other around the pin 6. In the neighbourhood of the pin 6 and on one side 2a of the case member 2 is projected a pair of projections 13 as a first engaging portion adapted to slidably move a slider 70 arranged within the cartridge holding member 40 and rotate the member 40. On the front surface 9 of the side 4 of the case member 2 is bored with a pair of pin receiving holes 14 adapted to rotatably support an opening and closing handle 30.

Figure 6A:
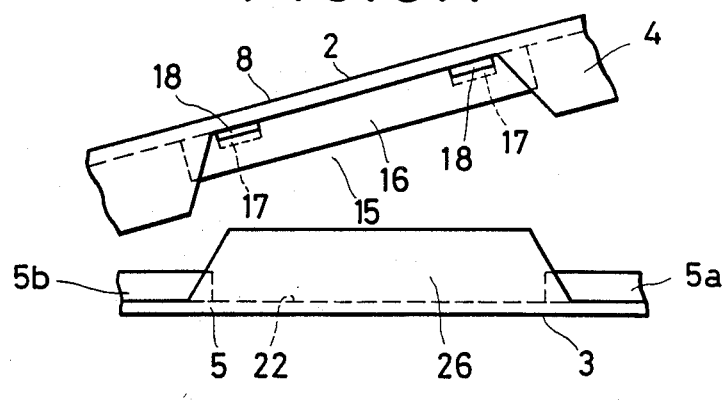
FIGS. 6A and 6B are respectively enlarged views of a portion provided with a card engaging projection for the case shown in FIG. 1.
Figure 6B:
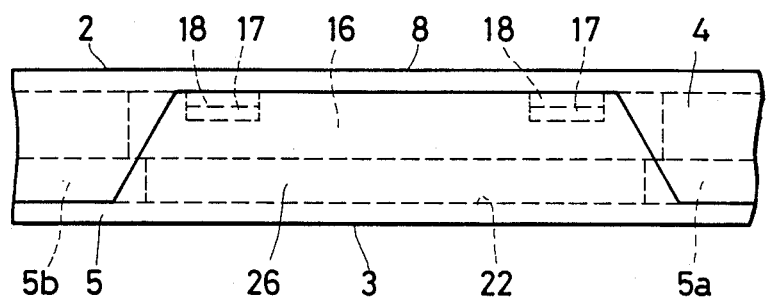

A trapezoidal notch or cut 15 is formed in the middle of the side 4 of the case member 2, and a card engaging member 16 is formed adjacent to the cut 15 as shown in FIG. 6A. The card engaging member 16 stands on different level from the side 4, and a card engaging projection 17 is projected internally of the member 16. In the neighbourhood of the member 17 is formed a hole 18 formed during molding.

One end 2a of the case member 2 is cut into a shape, and the cartridge holding member 40 is positioned in the space 19. During the assembling operation in which the case member 2 is mounted on the case member 3, when the pin 6 of the case member 2 is inserted into the hole 7 of the case member 3, the side 4 on which the pin 6 is provided has to be flexed. Such flexure may be made easily by formation of the space 19 into ]-shape.

An inclined surface 20 is formed on a portion where the case member 2 may abut against the member 40.

The opening and closing handle 30 is in a ] shape on the whole, and a pair of pins 32 provided internally of both sides 31 are fitted into pin receiving holes 14 whereby the handle 30 may be rotatably supported on the other end which is opposite one end 2a among the sides 4 of the case member 2.

A recess 33 which is a second engaging portion engaging a projection 21 which is a second portion to be engaged formed on the side 5 of the case 3 is provided near a pair of pins 32. Internally of both the sides 31 are formed cut portions 34 having approximately the same depth as the height of the projection 21, and inclined surfaces 35 are formed on the peripheral edge of the cut portions 34 to guide the projection 21 toward the recess 33.

The case member 3 has a bottom surface 22 generally in the shape of a rectangle, which is formed with a generally ]-shaped recess 23 in the middle on the other side thereof. This recess 23 corresponds to the recess 11 of the case member 2 and is formed with a tapered surface 24 on the side of the recess 23 opposite to the case member 2 and on the side end of the handle 30 so as to be easily engaged by the finger.

A notch 25 is formed in the periphery of the projection 21. This notch 25 is provided in order that a portion on which projection 21 is provided may be easily flexed and the projection 21 may be brought into engagement with the recess 33 of the handle 30.

A trapezoidal side wall 26 corresponding to the notch 15 of the case member 2 is formed in the middle of the side 5 of the case member 3. Sides 5a and 5b on both wings of the side wall 26 are provided inwardly of the side wall 26 so that when the case member 2 and 3 are closed, they are fitted in the side 4 of the case member 2 to provide one and the same plane of the side 4 and the side wall 26.

In the periphery of the hole 7 of the case member 3 is formed a guide groove 27 in the form of a semi-circular arc for guiding the projection 13 of the case member 2. In the neighbourhood of the end of the guide groove 27 is provided a resilient projection 28 formed at the end with a protrusion 29 as shown in FIG. 4C.

When the cartridge holding member 40 has rotated to a predetermined position upon rotation of the case member 2, the resilient projection 28 causes the member 40 to be locked at said predetermined position and to lock a disk cartridge 50 in a state where it is levitated between the case member 2 and the case member 3. That is, the projection 13 of the case member 2 is supported at the predetermined position by the protrusion 29 of the resilient projection 28. Thereby, the case member 2 is locked at the predetermined position, as a consequence of which the cartridge holding member 40 is also locked at the predetermined angle.

On one end of the bottom 22 of the case member 3 is provided a pair of left and right openings 38 to which a portion of the member 40 is fitted, and an inclined surface 39 is formed in the peripheral edge thereof.

The cartridge holding member 40 has a section in the form of a ]-shape, and an inclined surface 46 is formed in the peripheral edge on the side of the case member 3 thereof. In the periphery of the pin 43 of the member 40 is formed a groove 44 in the form of a semicircular arc. As shown in FIGS. 4C and 5, the projection 13 of the case member 2 is brought into engagement with the groove 44 through the guide groove 27 of the case member 3, and the projection 13 is slidably moved within the guide groove 27 and the groove 44. The end 45 of the groove 44 as the first portion to be engaged is pushed by the projection 13 to thereby rotate the member 40.

The groove 44 is formed so that when the case member 2 is rotated through 120°, the projection 13 may abut against the end 45. Therefore, as shown in FIG. 2, when the case member 2 is opened through 180°, the member 40 is rotated to an angle of 60°. A slider 70 is slidably mounted within the member 40 to cause the disk cartridge 50 to be slid within the member 40. The slider 70 is formed at both sides with groove 73, and the projection 13 of the case member 2 is brought into engagement with the groove 73, as shown in FIGS. 3, 4A to 4C and 5. The slider 70 is integrally formed with a projection 74 which slidably contacts the upper surface of the member 40 to slidably move the slider 70 in a stabilized posture. The slider 70 is also provided with a pair of cartridge engaging portions 71. This member 71 is formed from a resilient member, at the end of which is formed a hook portion 72.

Then, an inner curved portion of the hook portion 72 is brought into elastic engagement with the recess 81 of the side wall 51 of the disk cartridge 50 whereby the disk cartridge 50 is retained by the hook portion 72 from the side to pull the cartridge 50 into the member 40 and to prevent the cartridge 50 from being disengaged from the member 40 even if vibrations, shocks or the like are applied to the case 1 when the case 1 is opened. The recess 81 also serves to pull the cartridge 50 into the disk player (not shown).

The operation of the disk cartridge keeping case 1 will be described.

Figure 7A:
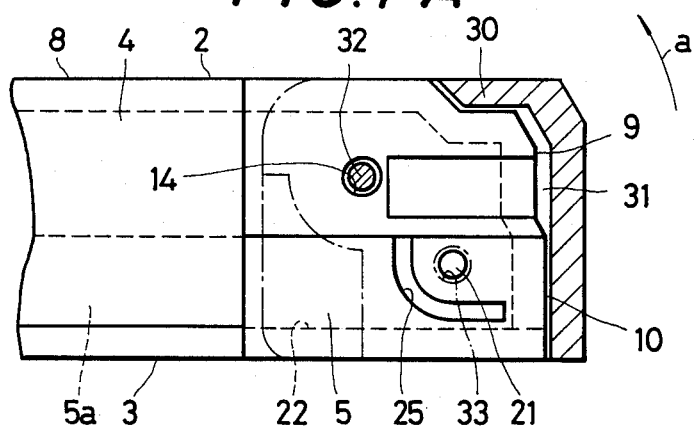
FIGS. 7A and 7B are respectively perspective views of a portion provided with a case opening and closing handle for the case shown in FIG. 1.
Figure 7B:
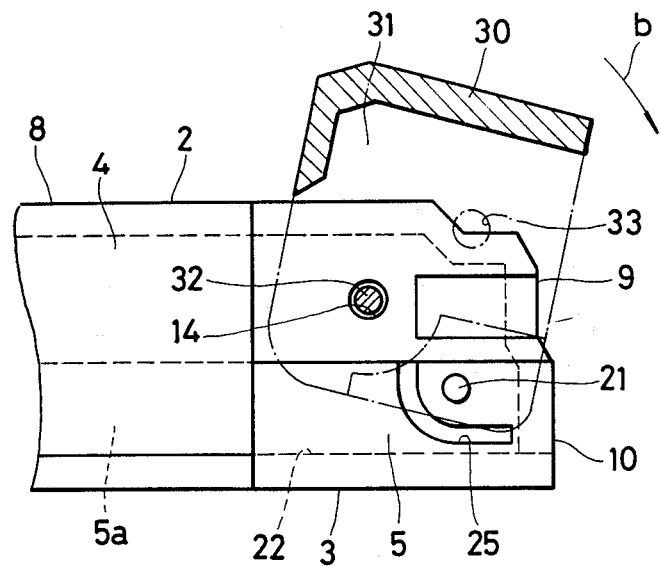
Figure 8A:
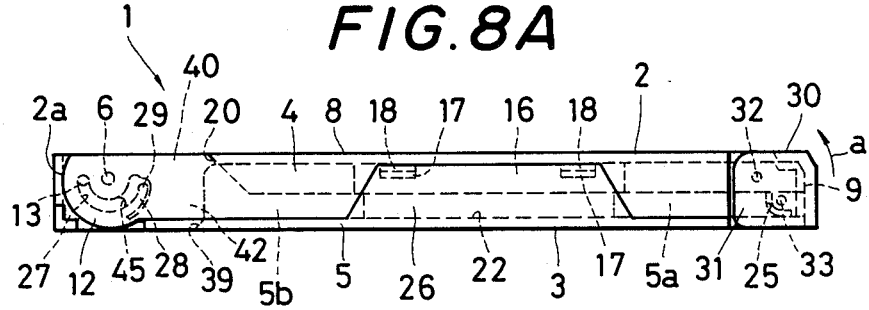
Figure 8B:
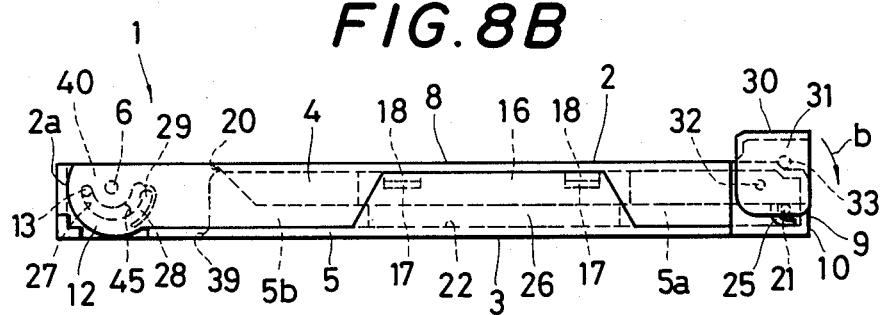

In order to open the case 1 closed as shown in FIGS. 7A and 8A, the handle 30 is first rotated in the direction of arrow a to assume the state as shown in FIGS. 7B and 8B. At that time, the engagement between the recess 33 of the handle 30 and the projection 21 of the case 3 is released to release the locking between the case member 2 and the case member 3. Then, the handle 30 is raised and the case member 2 is rotated as indicated by the dashed line in FIG. 1.

As the case member 2 rotates, the projection 13 of the case 2 is slidably moved within the guide groove 27 of the case member 3 and the groove 44 of the cartridge holding member 40 and also slidably moved within the groove 73 of the slider 70 arranged within the member 40 to slide the slider 70 in the direction of arrow c, that is, from the FIG. 4A position to the FIG. 4B position. Thereby, the disk cartridge 50 slides on the case member 3 and is extruded outwardly of the case 1 as shown in FIG. 8C. Thereafter, when the case member 2 is rotated through 120°, the projection 13 pushes the end 45 of the groove 44 to cause the member 40 to be rotated.

When the projection 13 reaches the end of the guide groove 27 while pressing the protrusion 29 of the resilient projection 28 as shown in FIG. 4C, the rotation of the case 2 and the member 40 stops, and the projection 13 is locked at that position by the protrusion 29. As the result, the case member 2 and the member 40 are locked at a predetermined position, and therefore, the case member 2 and the member 40 are not returned by the weight of the cartridge 50 and never returned to their original position. Accordingly, the cartridge 50 is to be locked in a state where it is levitated between the case member 2 and the case member 3. This state is shown in FIG. 4C and 8D. By holding the upper and lower surfaces of the cartridge 50, it is pulled out of the member 40 for use.

In order to close the case 1, the handle 30 is held, and the case member 2 is rotated closer to the case member 3. Upon the rotation of the case member 2, the projection 13 is moved from the position indicated by the solid line in FIG. 4C within the guide groove 27 and the groove 44 while pressing the protrusion 29 of the resilient projection 28 as indicated by the dashed line and moving the member 40 and the slider 70 as shown in FIG. 4A.

When the case member 2 is closed, the slide wall 26 of the case member 3 is fitted into the notch 15 of the case member 2 to cover the hole 18 of the card engaging member 16 from outside.

After the case member 2 has been closed, the handle 30 is rotated in the direction of arrow b in FIGS. 7B and 8B to bring the recess 33 and the projection 21 into engagement with each other to lock the case member 2 and case member 3. This state is shown in FIGS. 1, 7A and 8A.

In the above-described embodiment, the cartridge holding member 40 is not formed integral with the case member 2 and the case member 3 but is separately assembled. Where the member 40 is provided in the form integral with the case member 2 and case member 3, the bottom surface 22 of the case member 3 need be inclined in order to remove the metallic mold. If the case 1 becomes large, a difference of a wall thickness of the bottom surface 22 increases between the one end and the other of the case 1.

However, in this embodiment, the case 1 and the member 40 are separately formed, and therefore the bottom surface 22 need not be inclined in order to remove the metallic mold.

While in the above embodiment, the second engaging portion provided in the handle 30 and the second portion to be engaged provided on the case member 3 are constituted by the recess 33 and the projection 21, respectively, it will be noted that the recess as the second engaging portion and the projection 21 as the second portion to be engaged can be constituted reversely, or the second engaging portion can be constituted by a pawl, and the second portion to be engaged can be constituted by a hole into which the pawl is fitted. That is, any suitable form of the second engaging portion and second portion to be engaged may be employed as long as the case member 2 and the case member 3 may be locked by rotation of the handle 30.

Furthermore, the shape of the handle 30 is not limited to that shown in the embodiment but can be variously modified on the basis of technical idea of the present invention.

Moreover, the present invention is widely applied not only to the disk cartridge keeping case 1 but also keeping cases for optical disks, optical magnetic disks; magnetic tape cassettes, etc.

Having described illustrative embodiment of the invention with reference to the accompanying drawings, it is to be understood that the invention is not limited to such precise-embodiment, and that various changes and modifications may be effected therein by one skilled in the art without departing from the scope and spirit of the invention as defined in the appended claims.

What is claimed is:

1. A recording medium keeping case comprising: a first case member pivotally supported with a second case member by a pivot in the vicinity of one end thereof, said first case member being rotatable relative to said second case member about said pivot between a first position and a second position through a third intermediate position;
    a recording medium holding member rotatably supported on said second case member at said pivot and being housed between said first and second case member when the case is closed;
    a first engaging portion provided on said first case member; and a cooperating abutting portion provided on said recording medium holding member, said abutting portion abutting said first engaging portion when said first case member is rotated to said third position relative to said second case member, further rotation of said first case member from said third position to said second position causing said recording medium holding member to rotate relative to said second case member;
    wherein said first engaging portion comprises a projection provided on one end side of said first case member adjacent said pivot, and said first case member is rotated relative to said second case member to rotate the projection about said pivot whereby said projection is brought into engagement with the abutting portion.

2. The case according to claim 1, wherein said case further comprises a slider supported within the recording medium holding member so that said slider may be slidably moved relative to said holding member, and said first case member being rotatable so as to be parted from the second case member to rotate said projection around said pivot whereby said slider is moved by said projection toward the other end of the second case member, and the recording medium held on said holding member is extruded toward the other end of said second case member by said movement of the slider.

3. The case according to claim 2, wherein said slider is provided with a pair of hook portions, by which said recording medium is held.

4. The case according to claim 2, wherein a lock means is provided on said first case member to lock said first engaging portion at a position wherein said first case member is rotated to said second position holding said slider at its extended position.

5. The case according to claim 1, comprising:
    an opening and closing handle supported at opposite sides on the other end side of said first case member so as to be rotated around the other end portion of said first case member;
    a second engaging portion provided on said handle; and
    a second portion to be engaged provided on said second case member, said second portion being engageable with said second engaging portion, wherein said handle is held by hand to rotate said first case member with respect to said second case member to thereby open or close the case, and said handle is rotated in said closed state to provide engagement or disengagement between said second engaging portion and said second portion to be engaged to lock or unlock the case.

6. A recording medium keeping case comprising: a first case member pivotably supported with a second case member by a pivot in the vicinity of one end thereof;
   a recording medium holding member rotatably supported at said pivot with said second case member and being housed between said first and second case member when the case is closed;
   a projection provided on a side wall of said first case member; and
   a groove provided on said recording medium holding member, said projection engaging upon an end edge of said groove when said first case member is rotated from a closed position to an intermediate position at a predetermined angle relative to said second case member whereupon said recording medium holding member is rotated by said first case member.

7. A disc cartridge keeping case comprising:
   a first case member pivotably supported with a second case member by a pivot in the vicinity of one end thereof;
   an opening and closing handle rotably supported with the other end of said first case member and having a first locking member engaged with a second locking member provided with the other end of said second case member for selectively locking said first and second case member at closed position;
   a disc cartridge holding slider slidably supported with said second case member being housed between said first and second case member when the case is closed and having a cartridge engaging portion formed with a resilient member, at the end of which is formed a hook portion which is brought into elastic engagement with a recess of a side wall of the disc cartridge;
   a projection provided on a side wall of said first case member; and
   a groove provided on said disc cartridge holding slider in a direction normal to the sliding movement thereof and engaged with said projection, thereby said disc cartridge holding slider is slid as said first case member is rotated relative to said second case member.

8. The case according to claim 7, wherein said first locking member comprises a recess and said second locking member comprises a projection and a notch formed around periphery of said projection.

* * * * *